United States Patent [19]
Mathias

[11] Patent Number: 6,046,667
[45] Date of Patent: *Apr. 4, 2000

[54] PRESSURE TRANSDUCER WITH POROUS MATERIAL FOR MEDIA ISOLATION

[75] Inventor: Milton W. Mathias, Minneapolis, Minn.

[73] Assignee: Honeywell Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,977

[22] Filed: Dec. 23, 1997

[51] Int. Cl.$^7$ ....................................... H01C 10/10
[52] U.S. Cl. ................................. 338/36; 73/723
[58] Field of Search ................. 338/36, 42; 73/706, 73/715, 723–727, 756, 866.5, 728

[56] References Cited

U.S. PATENT DOCUMENTS

| | | |
|---|---|---|
| 2,747,407 | 5/1956 | Knoll . |
| 3,374,664 | 3/1968 | Lefelhocz . |
| 4,481,808 | 11/1984 | Sakata et al. .......................... 73/6.1 R |
| 4,912,981 | 4/1990 | King et al. ................................ 73/706 |
| 4,970,898 | 11/1990 | Walish et al. ............................. 73/706 |
| 5,361,627 | 11/1994 | Levesque et al. .......................... 73/73 |
| 5,614,659 | 3/1997 | Rickman et al. ...................... 73/35.16 |
| 5,693,887 | 12/1997 | Englund et al. .......................... 73/723 |
| 5,747,694 | 5/1998 | Baba et al. ................................ 73/706 |
| 5,858,224 | 1/1999 | Schwandt et al. ........................ 210/90 |

*Primary Examiner*—Teresa Walberg
*Assistant Examiner*—Jeffrey Pwu
*Attorney, Agent, or Firm*—Kris T. Fredrick

[57] ABSTRACT

A pressure transducer which has a housing containing a sensing element and a noncorrosive fluid in contact with the sensing element. A porous material isolates the fluid from a harsh liquid or a liquid containing solids while allowing transmission of the pressure of the liquid.

14 Claims, 1 Drawing Sheet

PRESSURE TRANSDUCER WITH POROUS MATERIAL FOR MEDIA ISOLATION

BACKGROUND OF THE INVENTION

The present invention is related generally to pressure transducers and particularly to the isolation of the pressure sensing elements of the pressure transducer from the media that represents the pressure to be measured.

A barrier diaphragm is commonly used to separate pressure sensing elements from the media whose pressure is being measured. This is done in order to protect the pressure sensing element from electrically conductive or chemically active media. Frequently, the sensing element operates in some form of oil or hydraulic fluid which serves to transmit pressure from the back side of the barrier diaphragm to the sensing element. In this manner, the harsh media remains on the outside of the barrier diaphragm while the sensing element is protected in a benign fluid. Barrier diaphragms are typically made from stainless steel or similar material and are typically 0.002 includes to 0.004 inches thick, resulting in a delicate member which must be protected from physical contact with anything that might dent or deform the diaphragm. Pressure measurement errors of a temporary or permanent nature will result if the diaphragm is deformed from the shape that existed when the transducer was calibrated.

Certain applications of pressure transducers require the transducer to operate in an environment where the liquid media, whose pressure is being measured, is mixed with solid particles which have the capability to dent and deform a barrier diaphragm, thus producing temporary or permanent measurement errors. One example of this is when liquid media is trapped in the porous rock formations beneath the surface of the earth. In this example, the pressure transducer is forcibly inserted into the porous rock and the liquid media is allowed to enter the transducer where the pressure is measured. Rock fragments coming in contact with a barrier diaphragm would cause measurement errors. Another condition having the capability to damage barrier diaphragms are high acceleration forces present when a pressure transducer is forcibly inserted into porous rock. Under high g-forces, the mass of the diaphragm and the hydraulic fluid behind it can permanently deform the diaphragm, thus producing permanent calibration errors in the transducer.

Another example of a media that could damage a barrier diaphragm would be where a pressure transducer is used to measure the pressure of a mixture of a liquid and particles in a pipeline, such as a pipeline used for transporting a slurry.

Thus a need exists for a pressure transducer that isolates the media being measured from particles contained in the media and is tolerant of the high acceleration forces that the transducer may be subjected to in certain applications.

SUMMARY OF THE INVENTION

The present invention solves these and other needs by providing a pressure transducer including a housing containing a sensing element, electrical connections to the sensing element which are accessible at the transducer, and a fluid in contact with the sensing element. A porous material isolates the fluid from a harsh liquid, the pressure of which is to be measured while allowing transmission of the pressure of the harsh liquid to the fluid.

DETAILED DESCRIPTION

Figure 1:
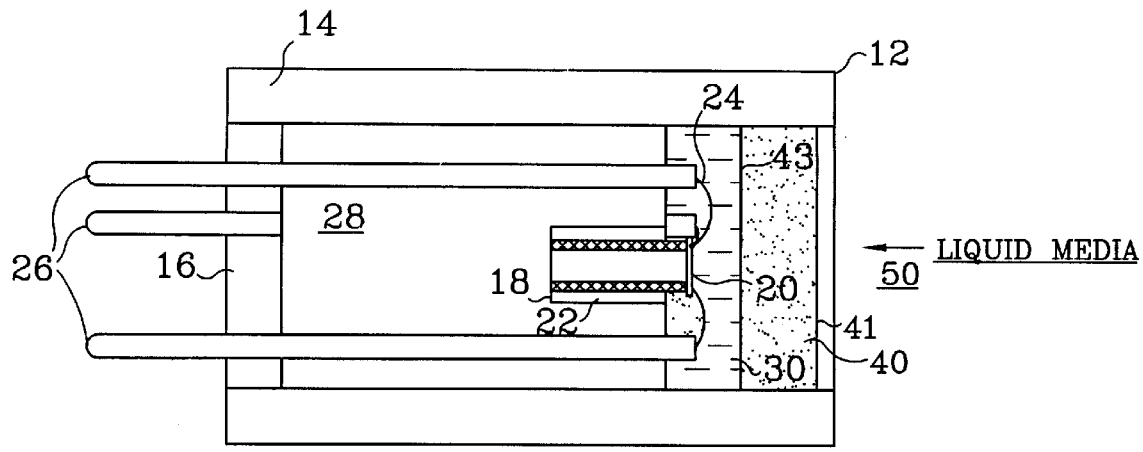
FIG. 1 shows a cross sectional view of a pressure transducer according to the teachings of the present invention.

A pressure transducer is shown in the drawings and generally designated 10.

Device 10 includes a housing 12. Housing 12 includes a cylindrical body 14 having an end 16. Housing 12 contains a sensing module 18. Sensing module 18 includes, for example, a silicon diaphragm sensing element 20 and may include a reference pressure section 22. Electrical connections, for example wire bonds 24, are typically made between sensing element 20 and conductive paths or package pins 26. Package pins 26 include a portion inside housing 12 and a portion extending to outside housing 12. An insulative material 28 surrounds pins 26 within housing 12. Sensing element 20 is in contact with an insulative noncorrosive fluid 30, such as hydraulic fluid or another suitable fluid. A porous material or filter 40 has an end or surface 43 in contact with fluid 30 and an end or surface 41 in contact with a liquid media 50, the pressure of which is to be measured.

Thus, porous filter 40 serves to separate hydraulic fluid 30 surrounding sensing element 20 which is placed on one side of filter 40 from the harsh liquid media being measured on the other side of the porous filter 40. The transducer 10 is constructed such that the hydraulic fluid 30 penetrates the tiny openings or passages in filter 40 and is retained by capillary attraction to the tiny openings. When subjected to liquid media 50, the media 50 also penetrates the pores 42 of filter 40 from the outside where it contacts the hydraulic fluid inside each pore. A hermetic barrier is not established. Rather, the hydraulic fluid is retained by capillary attraction to the many surfaces inside the filter. The barrier diaphragm of, for example, stainless steel, is eliminated, thus doing away with potential damage due to high acceleration forces. Although some mixing of media and hydraulic fluid will occur, the small openings inside filter 40 minimize the amount. Accurate pressure measurement in liquid media, mixed with solids, is possible.

Figure 2:
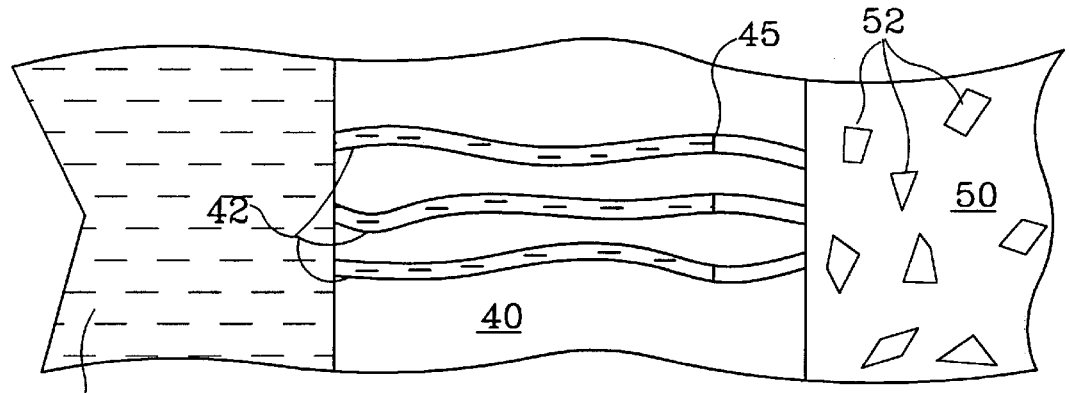
FIG. 2 shows a greatly enlarged diagrammatic representation of a portion of the pressure transducer of FIG. 1.

The present invention involves the use of a porous filter 40 to separate hydraulic fluid 30 surrounding the sensing element 20 from the harsh liquid media 50. Porous filter 40 may be of metallic, ceramic or other material. As illustrated in greatly enlarged representation in FIG. 2, hydraulic fluid 30 penetrates tiny openings or pores 42 in filter 40 from the inside and is retained by capillary attraction within tiny openings 42. Liquid media 50 also penetrates pores 42 of filter 40 from the outside where it contacts the hydraulic fluid 30, for example at 45, inside each pore. Particles 52 are prevented from passing through pores 42 of filter 40 due to the small size of pores 42. However, the pressure of liquid 50 is transmitted through pores 42. The hydraulic fluid 30 is retained by capillary attraction to the many surfaces inside the filter. A unique feature of the present invention is the elimination of the barrier diaphragm which is brought about by allowing capillary attraction to retain the hydraulic fluid surrounding the pressure sensing element.

Porous materials that may be used for filter 40 are known in the art, for example, ceramic or stainless steel filters having pore sizes from fractions of microns to hundreds of microns are sold commercially in the form of disks, rods, plates and slabs for use in filtering liquids and gases. These filters are also available in a wide variety of metals, such as brass, bronze, aluminum, etc.

Figure 3:
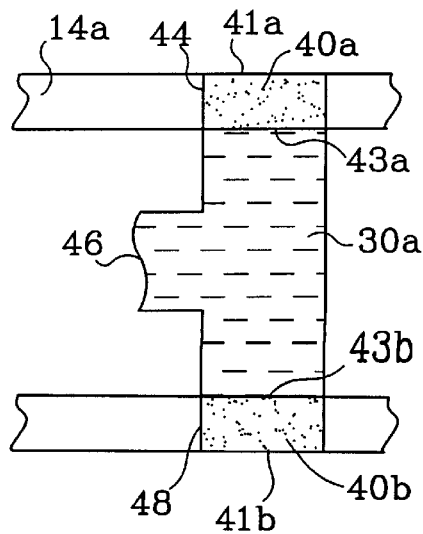
FIG. 3 shows a partial cross section view of an alternate embodiment of a pressure transducer according to the teachings of the present invention.

The embodiment of FIG. 1 shows porous material 40 at an end of a cylindrical body 14. Many other arrangements are possible. For example, an alternate embodiment is shown in FIG. 3 where filters 40*a* and 50*b* are located at openings or windows 44 and 46 in cylindrical body 14*a*. The liquid media, the pressure of which is to be measured, would be surrounding body 14*a* and would be in contact with surfaces 41*a*, 41*b* of filters 40*a* and 40*b*. A non-corrosive fluid, such as hydraulic oil 3*a* for example, would be in contact with surfaces 43*a* and 43*b* of filters 40*a* and 40*b*. A sensor module would sense the pressure of oil 30*a* at 46. Various arrangements for the location of the porous material filters can be devised. In addition, housing 12 may, of course, be of various shapes or combinations of shapes other than the cylindrical shape shown in the figures.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

I claim:

1. A pressure transducer for measuring a pressure in a liquid media comprising:

a sensing element;

electrical connections to said sensing element, said connections accessible at said transducer;

a fluid contacting said sensing element;

a housing, said sensing element and said fluid located in said housing;

a porous material located between said liquid and said fluid, said porous material allowing transmission of said pressure to said fluid while isolating said liquid from said fluid.

2. Pressure transducer of claim 1 wherein said fluid enters pores located at a first side of said porous material and said liquid enters pores located at a second side of said porous material.

3. Pressure transducer of claim 1 wherein said porous material comprises a metallic material.

4. Pressure transducer of claim 1 wherein said porous material means comprises a ceramic material.

5. A pressure transducer for measuring a pressure of a liquid media comprising:

a housing;

a sensing element located in said housing;

electrical connection means located at an exterior of said housing and connected to said sensing element;

a fluid within said housing, said fluid in contact with said sensing element;

means for isolating located between said liquid and said fluid, said means for isolating comprising a porous material extending between said liquid and said fluid.

6. Pressure transducer of claim 3 wherein said porous material contains small passages that prevent particles in said liquid larger than a first size from passing through said porous material.

7. Pressure transducer of claim 6 wherein said porous material is at a plurality of locations in said housing.

8. Pressure transducer of claim 5 wherein said means for isolating comprises a metallic material.

9. Pressure transducer of claim 5 wherein said means for isolating comprises a ceramic material.

10. A pressure transducer for measuring a pressure in a liquid media comprising:

a sensing element;

a fluid contacting said sensing element;

a housing, said sensing element and said fluid located in said housing;

electrical connections to said sensing element, said electrical connections accessible at said housing;

a material having passages, said material located between said liquid and said fluid, said material allowing transmission of said pressure through said passages to said fluid while isolating said liquid from said fluid.

11. Pressure transducer of claim 10 wherein said fluid enters passages located at a first side of said material and said liquid enters passages located at a second side of said material.

12. Pressure transducer of claim 11 wherein said fluid is retained in said passages by capillary attraction.

13. Pressure transducer of claim 12 wherein said material comprises a porous metallic filter.

14. Pressure transducer of claim 12 wherein said material comprises a porous ceramic filter.

* * * * *